(12) United States Patent
Redmond et al.

(10) Patent No.: US 7,984,562 B2
(45) Date of Patent: Jul. 26, 2011

(54) DEVICE AND METHOD FOR MARKING COMPETITION RINGS AND OTHER AREAS ON FLOOR SURFACES

(76) Inventors: Steven D Redmond, Boise, ID (US); Karen A Redmond, Boise, ID (US)

( * ) Notice: Subject to any disclaimer, the term of this patent is extended or adjusted under 35 U.S.C. 154(b) by 222 days.

(21) Appl. No.: 12/357,890

(22) Filed: Jan. 22, 2009

(65) Prior Publication Data

US 2010/0180459 A1 Jul. 22, 2010

Related U.S. Application Data (60) Provisional application No. 61/146,252, filed on Jan. 21, 2009.

(51) Int. Cl.
*B43L 13/20* (2006.01)
*G01B 1/00* (2006.01)
(52) U.S. Cl. .................................... 33/562; 33/1 G
(58) Field of Classification Search .................. 33/562, 33/1 LE, 1 G, 1 CC, 354, 347, 339, 333, 33/349, 351, 352, 413
See application file for complete search history.

(56) References Cited

U.S. PATENT DOCUMENTS

| | | | |
|---|---|---|---|
| 299,625 A | 6/1884 | Covell | |
| 464,205 A | 12/1891 | Swope | |
| 4,095,343 A | 6/1978 | McPhail | |
| 4,357,755 A * | 11/1982 | Allen et al. | 33/518 |
| 4,880,243 A | 11/1989 | Raub | |
| 5,107,595 A | 4/1992 | Stay et al. | |
| 5,371,949 A * | 12/1994 | Delaurier | 33/1 G |
| 5,427,383 A | 6/1995 | Viens | |
| 5,928,095 A | 7/1999 | Aldstadt | |
| 6,141,880 A | 11/2000 | Vircks | |
| 6,212,782 B1 | 4/2001 | Eisenmenger | |
| 6,880,261 B1 * | 4/2005 | Abbey | 33/759 |
| 6,978,553 B2 * | 12/2005 | Doublet | 33/756 |
| 7,487,595 B2 * | 2/2009 | Armstrong et al. | 33/286 |
| 7,814,672 B1 * | 10/2010 | Johnson, Jr. | 33/414 |
| 2006/0010705 A1 | 1/2006 | Dettellis | |

* cited by examiner

*Primary Examiner* — Yaritza Guadalupe-McCall
(74) *Attorney, Agent, or Firm* — Pedersen and Company, PLLC; Ken J. Pedersen; Barbara S. Pedersen (57) ABSTRACT

A template device is used layout and marking geometric shapes such as martial arts or other sports rings on a floor. The device includes a central body at or near the center, and an extension reaching from preferably at least three sides of the central body to the perimeter, of the geometric shape. Both central body and extension are rigid or substantially rigid, maintaining the shape of the template device, including optional wire/cable around or along the extension, during both use on the floor and transport to adjacent floor areas. The template device covers a very small percentage of the geometric shape area, by means of empty space in the extension or between members of the extension. The resulting lightweight and small-volume device is easy to move and break down into a small package. The extension may include radially-extending legs attaching at their outer ends to the wire/cable perimeter.

24 Claims, 8 Drawing Sheets

DEVICE AND METHOD FOR MARKING COMPETITION RINGS AND OTHER AREAS ON FLOOR SURFACES

This application claims priority of Provisional Application Ser. No. 61/146,252, filed Jan. 21, 2009 the entire disclosure of which is incorporated herein by this reference.

FIELD OF THE INVENTION

This invention relates generally to devices and methods for laying out geometric shapes, including areas, lines, or points, on a floor or other horizontal surface, and, more specifically, for laying out competition or exhibition rings for sports and games. The invented devices and methods may be used to mark an outer perimeter of the ring, and/or interior areas, lines, and points, that are important for the sport or game taking place in the ring. Preferred embodiments are used to lay-out square martial arts competition rings, for example, Taekwondo, Judo, Jiu-jitsu, and Karate rings, wherein multiple adjacent rings are typically outlined with tape on a floor, with walkways or corridors between the rings for those people judging or watching the competition. The preferred embodiments allow accurate marking of multiple rings by one or two people in a fraction of the time required for conventional methods.

BACKGROUND OF THE INVENTION

Many martial arts and other sporting tournaments frequently use a number of square competition rings outlined with masking tape on a gymnasium, recreation center, convention center, or other large floor or horizontal surface. As the venue typically changes from competition to competition, and is typically a rented or borrowed facility, a standard and permanent configuration is not practical and the ring markings must be temporary. The competitors or hosts must layout the rings with tools and tape that do not mar, damage, or leave residual markings or material on the rented/borrowed facility floor. Also, as discussed later in this disclosure, there is typically substantial time pressure to accomplish the task.

Many martial arts and other sporting tournament rings are typically separated by corridors (also called walk-ways or aisle-ways) that provide space for judges, spectators, or competitors to sit, stand, or walk. Each martial arts competition ring is typically a 14-18 ft. square, and may contain a parallel set of "sparring stripes" or other "face-off" location indicators near the center of the ring. Each of the preferred two sparring stripes is located 18 inches from the ring's center, and is perpendicular to two sides of the ring and to the judges' chairs that are typically placed in a corridor along one of said two sides. These sparring stripes serve as face-off points for the two competitors when they are free-sparring.

It is important for the martial arts competition ring to be an accurate polygon, for example, an accurate square, and the sparring stripes or other face-off location indicators to be correctly located so that one competitor does not have an unfair advantage over the other. For example, no sparring points can be scored while a competitor is outside the ring, so having one competitor starting off closer to the ring perimeter edge would be unfair. Likewise, a ring that is of an odd shape or is smaller than normal could cause a competitor to score fewer points over another competitor. Therefore, the challenge in laying out each ring is to consistently establish the ring's center and sparring stripes, allow for uniform corridors between adjacent rings, and ensure the ring itself is square and of the proper size. Accomplishing this challenge enhances the fairness of the competition and also the aesthetics and operability of the overall site layout (the group of rings in the particular facility, also called the "overall pattern").

Preparation time for layout-out of the rings in the rented or borrowed facility is allotted prior to commencing the tournament, but it is usually a very short time, such as 3 to 4 hours. Typically, only one or two people are designated to layout the tournament's rings (also called "establishing", "mapping and taping" or "measuring and marking" the rings). That short amount of time, coupled with the need to customize the overall site layout to the particular facility and the availability of few people to perform the task, places an inordinate level of pressure on those charged with establishing the rings, and on the tournament host and coordinator, who wish to start the competition on time.

After determining the desired overall site layout and location of ring baselines, each individual Taekwondo ring needs to be located and established within the overall site layout. Two conventional methods have been used in the past to establish each martial arts ring, specifically: 1) methods that utilize a pre-made, square, flexible-template made out of flexible material such as carpet, cloth or rope, and 2) plotting methods utilizing measuring tapes, carpenter squares and the Pythagorean Theorem of $a^2+b^2=c^2$ (also known as the more-practical 3-4-5 right triangle formula).

The flexible-template methods have the advantage of placing an existing square of fabric on the floor where the ring is to be. The flexible-template is comprised of a lightweight, easily portable fabric material, however, such soft material is prone to stretching or creases, which results in a less-than-accurate square. Also, most commonly-available sheet materials, such as carpet or fabric, do not come in 16-foot widths and therefore multiple panels must be cut and sewn together to attain the final 16-foot square template.

The plotting methods have the advantage of making it possible to establish a square with mathematical precision by using rigid steel tape-measures and easily portable carpentry tools like T-squares. However, this approach is very time-consuming and labor-intensive compared to the flexible-template method.

The inventors are aware of other tools, such as carpenter and construction tools, disclosed for laying out tennis courts, playing fields, or other constructions on the ground. These carpenter and construction tools, however, tend to be difficult to use accurately and/or quickly. While some or all of these tools may be effective for laying out a single rectangular field or structure, the time involved in using any of these tools to create an accurate rectangle is substantial and is the same or substantially the same each time a rectangle is marked. Thus, these tools offer no way for quick and accurate marking of multiple rectangles in succession. Examples from the patent literature are discussed below.

Most of the carpenter and construction tools may be called "string-based," wherein corner pieces are fixed to the ground by stake or pins, and strings extend between the fixed corner pieces. With such tools, the reference point(s) for the entire layout is/are one or more corners pieces placed on the desired outer perimeter of the shape being indicated and marked. Only the corner pieces of such systems are rigid, so that staking the corner pieces to the ground is required unless four people are recruited to hold down each corner piece. Even with said staking, the string-based systems tend to be inaccurate as they comprise relatively small rigid corners placed far apart and connected only with flexible strings or wires.

One example of such a string-based system is Covell (U.S. Pat. No. 299,625, issued Jun. 3, 1884). Covell discloses a system for laying out tennis grounds, wherein L-shaped (90- degree) corner pieces are fixed to the ground by spikes at the intended corners of the tennis court. Each corner piece includes a vertical post at its corner, and short, open channels on the two arms of the "L". String is wrapped around the vertical post and extends along both of said two arms, passing through the two short, open channels to extend to distant corner pieces of the same design. The alignment of the string in the open channels is used to indicate whether the stings are extending at 90 degrees to each other toward the distant corner pieces.

McPhail (U.S. Pat. No. 4,095,343, issued Jun. 20, 1978) discloses a system of four complex corner pieces that are staked into the ground at the intended corners of a wall or footing. Each corner piece includes crossed strips that define straight edges for aligning masons lines. As in Covell, string/lines are aligned relative to portions of the corner pieces to indicate whether the sting/lines are extending at 90 degrees to each other toward distant corner pieces.

Stay, et al. (U.S. Pat. No. 5,107,595, issued Apr. 28, 1992) disclose an "Accu-Square Marking System" for a foundation/perimeter for a building structure. The Stay, et al. system comprises triangular corner pieces that are staked to the ground, side-wires that extend between the corners pieces and two cross-wires that extend diagonally across the center of the square being marked. The diagonal cross-wires do not attach or connect to each other, but merely cross over each other at or near the center of the square, depending on the accuracy of the placement of corner pieces and side-wires. The midpoints of the diagonal cross-wires comprise indicia, and, if said midpoints cross over each other, the user is generally assured that the corners form right angles and the device will accurately depict a square.

Raub (U.S. Pat. No. 4,880,243, issued Nov. 14, 1989) discloses a flexible outer boundary demarcation element, the ends of which are joined to one another to form an endless element of a length greater than the perimeter of the playing court to be marked. Four loop segments are formed in the endless element, each of the loop segments forming a corner loop of predetermined circumference, the element crossing itself at a corner point at the base of the each loop at a generally right angle. Each corner loop is staked or pinned to the ground, with the intention that the endless element will therefore form a square shape.

Another group of carpenter and constructions tools, for marking a playing field or a building structure, comprise a single plate from which a single string extends. The plate is typically staked or otherwise fixed on a perimeter, or at the center, of the playing field or building foundation being marked, and the string is pulled to various locations as guided by radial markings on the plate. Examples of such systems are Viens (U.S. Pat. No. 5,427,383, issued Jun. 27, 1995), and Eisenmenger (U.S. Pat. No. 6,212,782, issued Apr. 10, 2001).

Therefore, in view of the above methods and patent literature, there is still a need for a competition/exhibition ring layout tool and method that allow quick, convenient, and accurate establishment of multiple rings in a short amount of time. The preferred embodiment of the invention meets these needs, by providing an easy-to-transport, -assemble, and -use, substantially rigid, template device that allows a single operator to quickly establish multiple sport/game rings or other geometric shapes on a floor. The preferred template device allows a single operator to layout a martial arts or other sporting competition ring and its sparring stripes accurately and without repeated adjustment and manipulation of the template device, and then to quickly move the template device to the next locations for additional rings without breaking down the tool and/or substantial manipulation of the tool. The preferred template device, once set up for use, remains as a single, substantially rigid, but light-weight, template that may be shifted to many positions on a single floor for making many rings in a fraction of the time required for traditional methods and tools.

SUMMARY OF THE INVENTION

The present invention comprises a device, and/or methods, for laying out geometric shapes on a floor or other horizontal surface, and, in preferred embodiments, for laying out competition or exhibition rings for sports and games. The invented device and/or methods may be used to mark geometric shapes on a floor that are important for the sport or game taking place in the ring, for example, an entire outer perimeter; points, lines, or areas on the outer perimeter; and/or points, lines, or areas in the interior of the ring. For example, the present invention may be used for Taekwondo, Judo, Jiu-jitsu, Karate, and other sporting tournaments or exhibitions.

The invented template device preferably comprises a central body at or near the center of the geometric shape to be indicated and marked on a floor or other horizontal surface, and an extension that extends out to, or near to, the perimeter of said geometric shape. Both of said central body and said extension are rigid or substantially rigid and cover a very small percentage of the surface area of said geometric shape. Due to the rigid or substantially-rigid nature of this very small structure (compared to said surface area), the indicating and marking task may be done without having to carry, place, and adjust a large, bulky, and/or cumbersome template such as the flexible templates discussed in Related Art. Also, because the preferred template device is pre-formed and/or pre-adjusted so that said extension structure naturally reaches to the perimeter, the indicating and marking task may be done without the labor-intensive and time-consuming plotting methods such as those discussed above in Related Art. The preferred rigid or substantially rigid extension of pre-determined dimensions also avoids a problem inherent in using string as a guiding or measuring tool, that is, the problem of string stretching. Said stretching, which is especially pronounced if string gets wet in humid air or from liquid on a mopped or cleaned floor, calls into question the accuracy and dimensions of the martial arts or other ring. This is especially true for long strings used for guidance and/or measurement of lengths greater than approximately 6 feet, for example, for 16 ft. square rings.

A thin, flexible perimeter band, such as a cable or wire, is preferably connected to the extension to lie continuously or substantially continuously along the entire perimeter of the geometric shape, without adding substantial weight to the template device. After the template device is set-up for use, adjusting and moving the template device may be done by lifting and maneuvering said central body, because, due to the rigidity (or substantial rigidity) of both the central body and the extension, force applied to the central body is transferred to the extension and, thereby, to the flexible perimeter band. Also, due to the rigidity (or substantial rigidity) of the central body and extension, the template device maintains or substantially maintains its in-use shape while being moved to adjacent portions or the floor/surface for continued use, especially when the template device is moved only by carrying said central body.

The central body may be various shapes that are adapted to connect, at least temporarily and preferably fixedly, to an inner portion(s) of the extension. For example, the central body may be a plate or plates, a box, a molded disc, or other hub-like members. The extension may be various shapes, for example, a network, or a radial arrangement, of thin, elongated, rigid or substantially rigid members. In preferred embodiments, the extension is made of thin legs that extend out from a hub, preferably to reach each corner of the geometric shape to be indicated and marked. With perimeter wires/cables preferably connecting two or more of said legs, a template is formed for marking an accurate, properly-sized and -shaped geometric shape.

With the template lying on the floor or other horizontal surface, the hub is preferably at or near the center of the geometric shape to be indicated and marked, and the leg outer ends define points on an outer perimeter of said geometric shape. The preferred legs are of sufficient rigidity that, upon being installed in, or extended from, the hub in the desired position and direction, each leg extends along the floor/surface to the desired outer perimeter without significant bending off of its respective desired leg line. Compared to conventional, elongated, flexible members, such as string, cable, wire, said legs may be said to be rigid or substantially rigid, and definitely more rigid than said conventional elongated flexible members. The legs reach to, and therefore indicate, pre-determined and predictable points at their outer ends. Also, the legs lie along, and therefore indicate, predetermined and predicable lines defined by the length of each leg.

The leg lengths, therefore, define lines between the hub and the perimeter. Thus, points at the ends of the legs, or points anywhere along the length of the legs, may be used as indicators or guides that allow a user to mark the floor at locations corresponding to said points and/or corresponding to lines between any two or more of said points. Thus, for example, a perimeter may be marked on the floor with straight lines between the ends of the legs, preferably guided by perimeter wires/cables between the outer ends of the legs. Also, for example, perimeter points or interior points may be marked on the floor with small markings, and perimeter or interior lines (including multiple lines that connect to close-in and indicate an area) may be marked on the floor between any combination of points on the perimeter, along the legs, and/or along surfaces of the hub. Optionally, cables may be used between various regions of the legs and/or the hub to act as indicators/guides for making interior lines.

Adhesive tape is the preferred marking material, but other materials, such as chalk, ink, paint, pegs, tacks, or other items or materials, may be used. In view of the above-discussed tendency for sports and games to be held in rented or borrowed facilities, adhesive tape that leaves little or no residue is preferred.

Different numbers, locations, and/or lengths of legs may be provided for connection to, or extension from, the hub, for marking different geometric shapes. While the preferred hub is at or near the center of the geometric shape rather than being on the perimeter of the geometric shape, the hub for irregular polygons, for example, may be nearer one side of the polygon than the others. Preferably, at least three legs are provided at different angular positions around the hub, wherein the angular positions may be even spaced (for example, four legs at 90 degrees apart, or three legs at 120 degrees apart) or may be unevenly spaced. Three legs would typically be used to mark a triangular area, four legs to mark a rectangle, five legs to mark a pentagon, etc.

The legs may be removable from the hub, or, less preferably, permanently attached to the hub. During use, the inner end of each leg is preferably fixed or restrained so it does not move in a direction parallel to the leg length. During use, the legs preferably lie generally in a single plane parallel to the floor or other horizontal surface on which the competition/exhibition ring is being marked. The hub may be various shapes, but is preferably a substantially planar unit that lies generally in the same horizontal plane as do the legs.

These and other features of the preferred embodiments will become apparent by viewing the Figures and studying the Detailed Description. While the Figures and Detailed Description portray details and specifics that may be beneficial for a particular use of the template device, that is, establishing square Taekwondo competition rings, the invention is not necessarily limited to those details and specifics, but, instead, may be modified and adapted for alternative uses and environments.

DETAILED DESCRIPTION OF THE PREFERRED EMBODIMENTS

Referring to the Figures, there are shown several, but not the only, embodiments of the invented device and method. The preferred embodiment of the device is a template device used for marking a ring on a floor for a sports or game competition or exhibition, and, most preferably, for Taekwondo competitions. While the preferred ring is a square ring comprising a square perimeter and two interior sparring stripes, the term "ring" includes various sports and games playing, competition, and exhibition areas of various sizes, shapes, and uses.

The preferred template device comprises a central hub unit with multiple legs extending outward from the central hub unit. The legs are one, but not the only example, of a rigid or substantially rigid extension that exhibits the features described in the Summary without covering the entire area to be marked as the ring. The legs, and other embodiments of the extension, by virtue of their rigidity or substantial rigidity, are differentiated from strings, cables, wires, straps, and other flexible elongated members. Also, the legs, and other embodiments of the extension, by virtue of covering a small portion of the geometric area being marked, are differentiated from a platform or other large rigid template, and from a flexible template such as a fabric or canvas sheet. For example, the extension preferably covers less than 33 percent, more preferably less than 10 percent, and most preferably less than 5 percent of the area of the geometric shape being indicated and marked. Alternatively, one may describe the preferred template device as having 67 percent or more, more preferably 90 percent or more, and most preferably 95 or more percent, open space (empty space, voids, apertures, gaps) within the bounds of its outermost extremities. For example, the central hub unit may be a substantially flat, compact, planar body on the order of 18 inches in diameter, and each leg may be on the order of 11 feet long and ½ inch in outer diameter, to form an approximately 16 ft square ring. The template device, therefore, lies substantially in a plane, covers a very small amount of the square ring being marked, and comprises substantially open space (empty space, void, apertures, gaps). Thus, the preferred legs extending from a compact central hub unit are one, but not the only embodiment, of an extension that cover less than 5 percent of said geometric shape. Further, because the central hub unit typically is small in diameter (or all of length, width, and thickness) relative to the length of the legs, the centrally-located "body" with multiple, relatively long legs extending outward away from the body, may remind one of a "spider".

Figure 13:
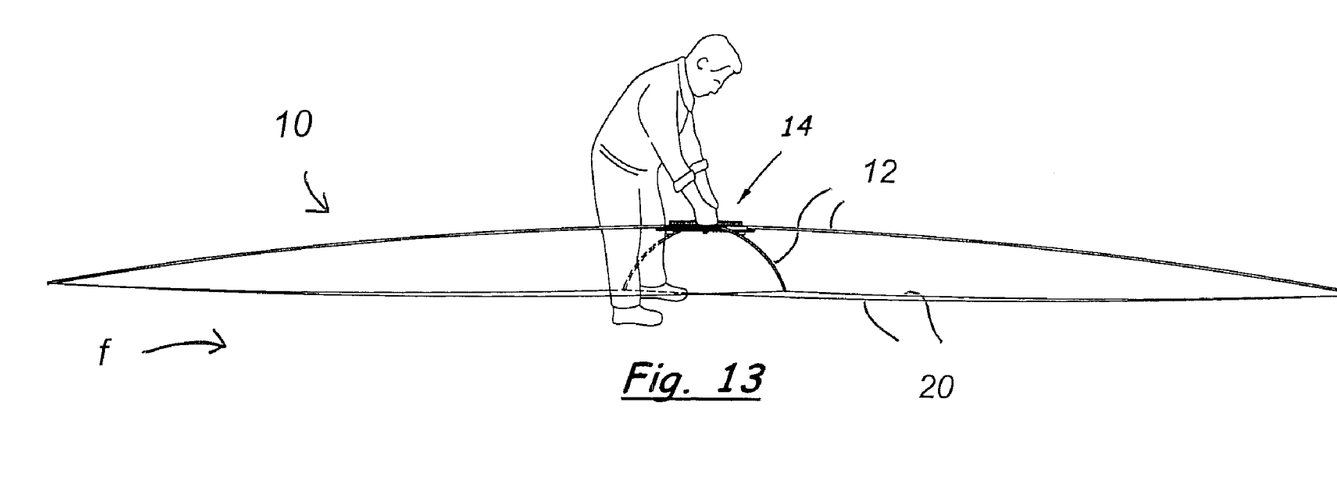
FIG. 13 is a schematic side view of a user moving one embodiment of the invention, the template device of FIG. 1A, wherein the user has lifted the hub to move the device to an adjacent location on the floor, for example, after establishing a first martial arts ring. With the hub lifted up off the floor a distance in the range of 1-3 feet, for example, the legs curve slightly and the leg outer ends and the cables slide and/or float along the floor, substantially maintaining the desired polygonal shape even while the device is being moved. Subsequently, the hub may be lowered down to the floor in said adjacent location, the legs will straighten or substantially straighten to push their outer ends and cables out to the full desired dimension of the polygonal shape.

Because the rigid or substantially-rigid legs are fixed, during use, to the rigid, generally centrally-located hub, a user may move the preferred template device easily and in one piece. While each leg is preferably rigid, or formed from rigid segments, some flexing of each leg is expected due to the leg's long length (for example, 5-20 feet long) and relatively small diameter (for example, ¼-1 inch in diameter). For example, in the case of an 11 ft. long leg of fiberglass segments, one may expect the leg to flex one or two feet off of the leg axis at a distal end when the leg is held in the air by the proximal end. Therefore, the preferred template device may be moved by lifting the hub, which also lifts the leg inner ends, and whereby the long, thin legs bend slightly so that the leg outer ends and their attached cables typically remain on the floor but "float" along with the hub to move with the hub. Thus, when the hub is carried a 2-3 feet above the floor, the outer ends of the legs and the cables are lifted slightly off of, and/or slide along, the floor. See FIG. 13.

The entire template device, therefore, acts as a rigid or substantially-rigid network of pieces, that substantially keeps it shape and size as it is moved to an adjacent portion of the floor for marking of another ring. Thus, a single user may easily mark multiple rings in quick succession, without little or no rearrangement and adjustment of the network of pieces of the template device between successive ring markings.

Preferably, in their storage configuration, the legs are removable from the hub unit and are collapsible into portions that may be easily transported and stored. The legs may be collapsed by folding, separating leg segments, sliding telescoping segments, or otherwise shortening, or disconnecting segments of, the legs. By breaking the preferred legs down into their many relatively short segments, they may be stacked along-side the hub, in a small and conveniently-carried package. The cables may be detached from the legs, coiled or wrapped around a holder, and also stored in said package.

The inner end of each leg is secured or otherwise retained in, or on, the central hub unit, and each leg is pre-measured and pre-formed and/or may be adjustable. This way, when the template is placed on the floor for use, each leg extends a specific distance from the hub unit so that its outer end lies on, or "points to" a point on the desired outer perimeter of the ring. If template placement results in some bending or swinging of the leg away from its longitudinal axis, despite the rigidity/substantial rigidity as discussed above, a user may easily adjust the legs by hand, and/or said resilience may return the legs, to lie along their respective desired leg lines.

In addition, in embodiments wherein perimeter cable(s) are attached to the legs, the cables may be pre-measured and pre-formed, or may be adjustable, so that each cable is sized to the proper length that matches its respective side of the ring. This way, cable force upon each leg is balanced, and rather than pulling the legs off of their respective desired leg lines, the cable(s) assist(s) in maintaining or returning the legs to their respective leg lines. Thus, the preferred cable(s) contribute to maintaining the leg outer ends in their desired orientation and spacing and to define a perimeter of the desired size and shape.

Figure 1A:
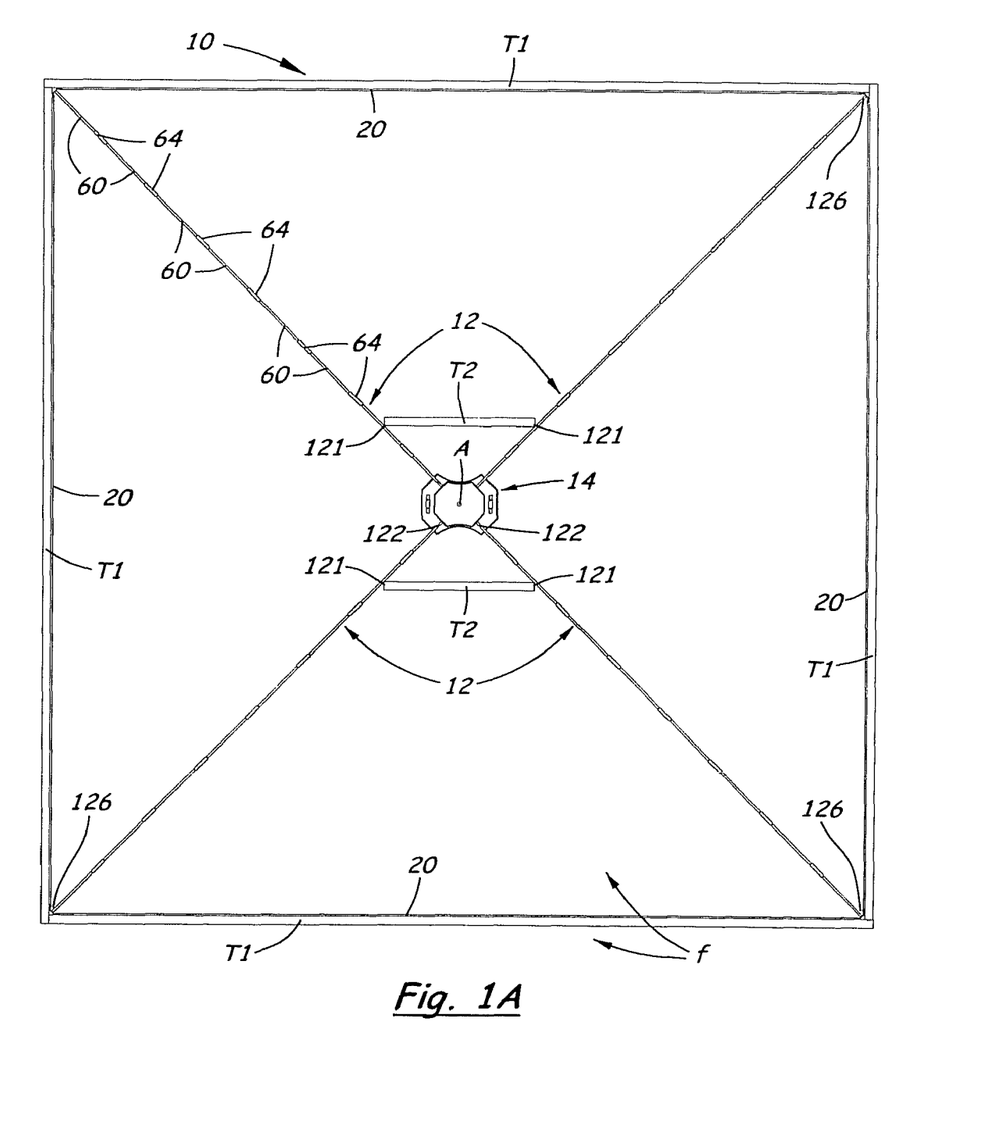
FIG. 1A is a top view of one embodiment of the invented template device, in use on a floor, wherein the template device has provided guidance and indicators for tape to be applied to the floor to mark the perimeter and the sparring stripes of a Taekwondo competition ring.
Figure 1B:
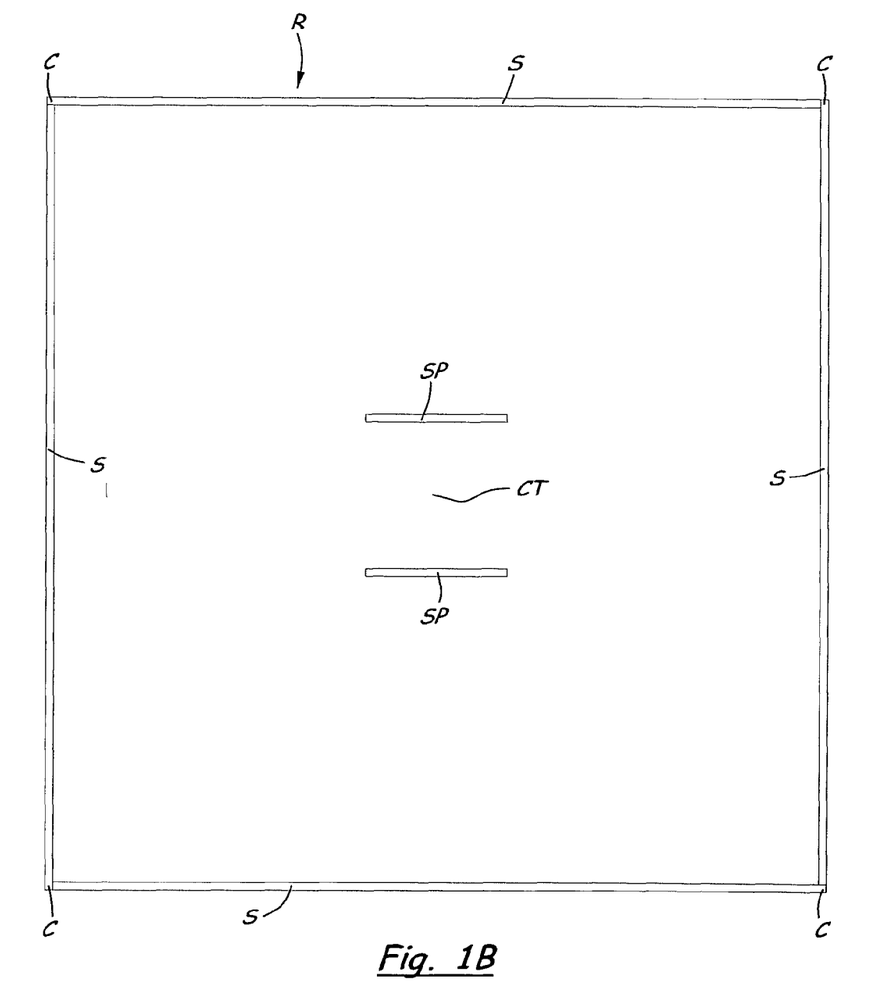
FIG. 1B is a top view of the Taekwondo ring of FIG. 1A, marked with tape on a floor, after removal of the template device.
Figure 2:
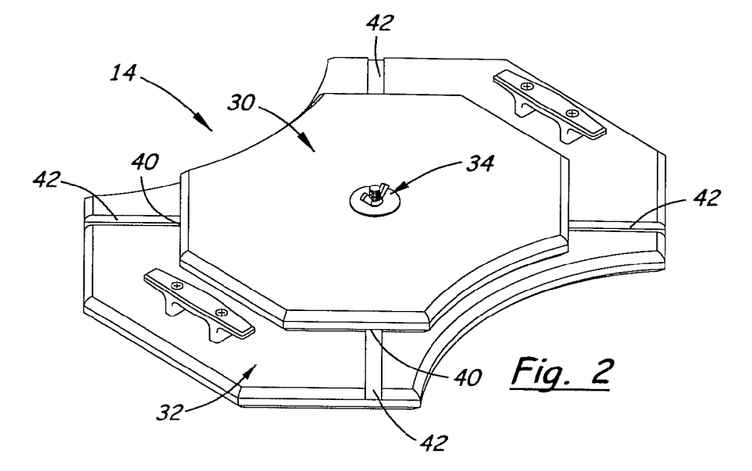
FIG. 2 is a top perspective view of one but not the only embodiment of a hub, that is, the hub unit of the embodiment of FIG. 1, with the plates of the hub unit connected together but with the legs removed.
Figure 3:
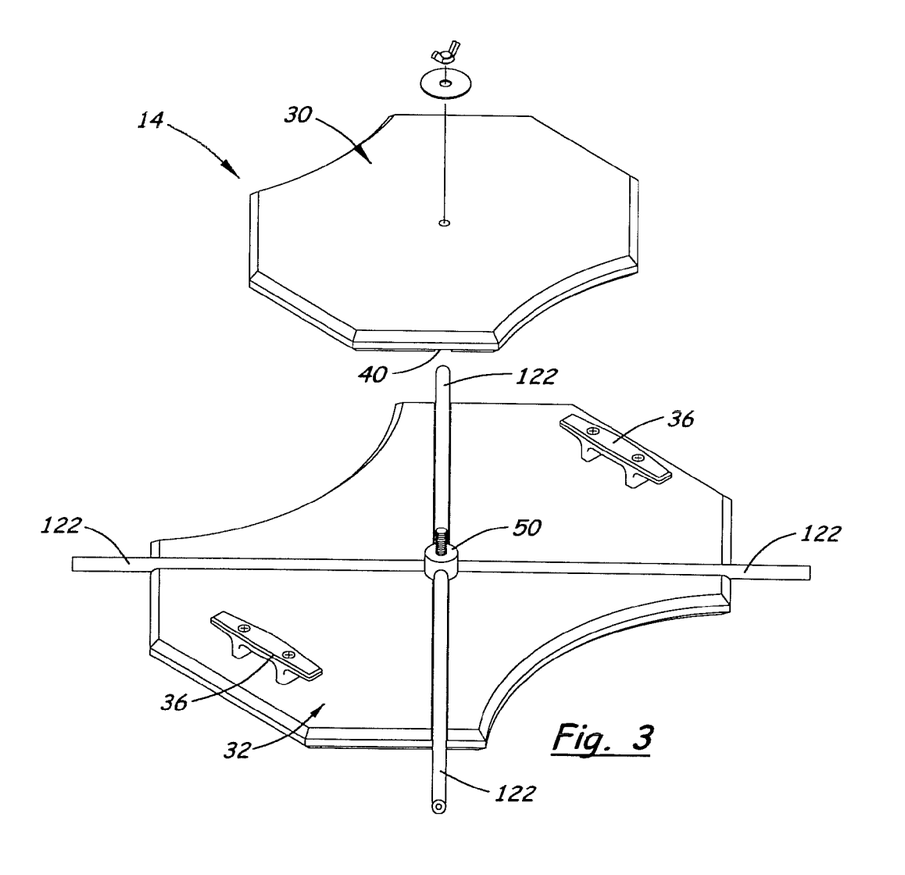
FIG. 3 is a top perspective view of the hub unit of FIGS. 1 and 2, with the top plate removed from bottom plate and with legs installed in the bottom plate.
Figure 4:
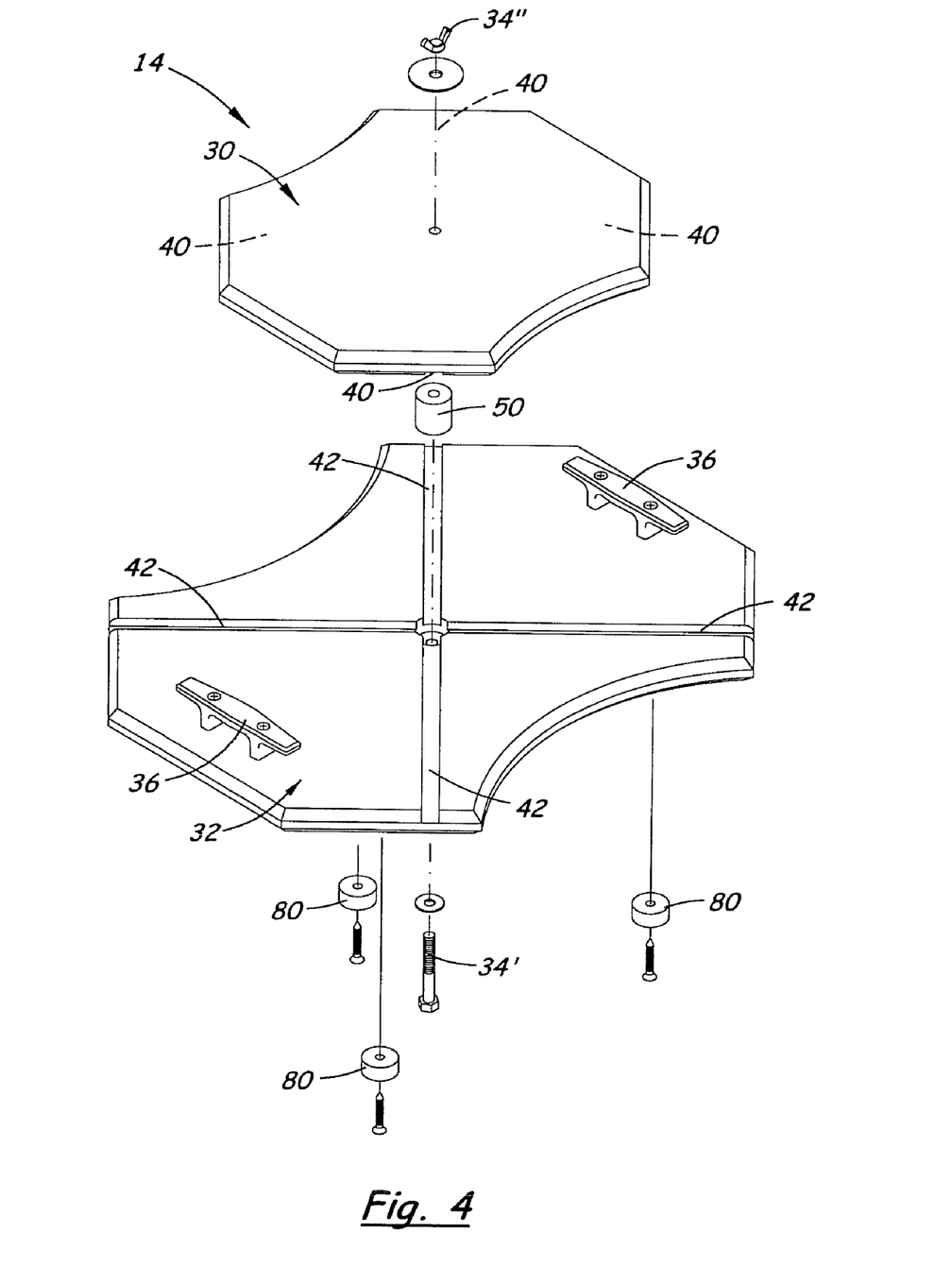
FIG. 4 is an exploded, top perspective view of the hub unit in FIGS. 1-3, with the legs removed.
Figure 5:
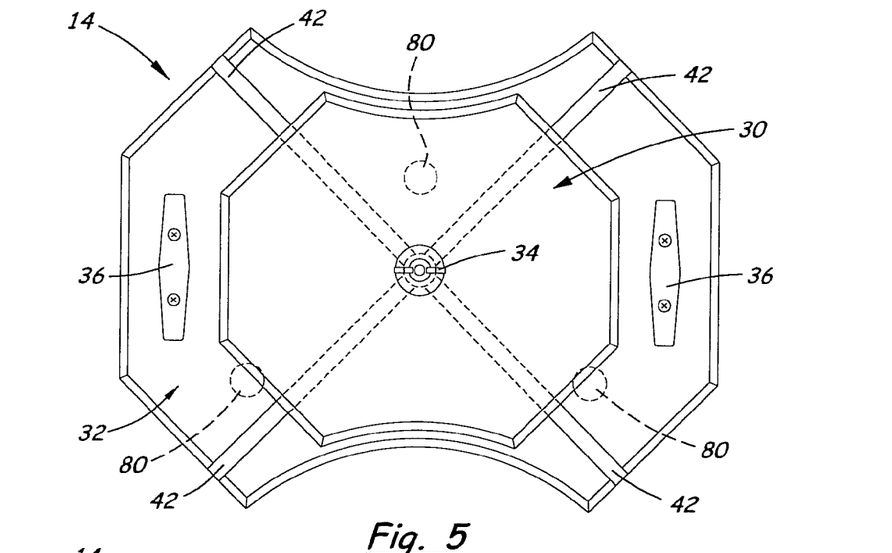
FIG. 5 is a top view of the hub unit of FIGS. 1-4 with legs removed.
Figure 6:
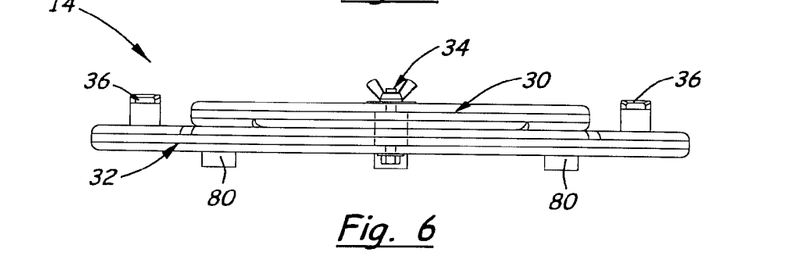
FIG. 6 is a side edge view of the hub unit of FIGS. 1-6, with legs removed.

Referring Specifically to the Figures:

The preferred template device 10 is placed on a floor F for laying out a square competition ring R, as shown in FIGS. 1A and 1B. Four legs 12 extend radially from the hub unit 14, with each leg 12 being 90 degrees to those legs adjacent to it, and all four legs 12 being of equal length. The four legs 12 extend to indicate, at their outermost ends, the four corners C of the ring R, and cables 20 connect the outer ends of the legs 12 to indicate the four sides S of the ring. Tape T1 is applied to the floor all around the perimeter of the ring R, on all four sides S. Tape T2 is applied in two lines, on opposite sides of the central hub unit 14, to serve as sparring stripes SP. These sparring stripes SP of tape T2 are placed on the floor between indicia 121 on the legs 12, so that the sparring stripes SP are a desired distance from the from the center axis A of the central hub unit 14 and, hence, from the center CT of the ring R. Indicia 121 are marked on the legs, prior to use of the template device 10, at known locations determined by standard geometric calculations for triangles.

It will be understood that alternative leg numbers, lengths, and/or angular positions in/on the central hub unit may allow templating and marking of rings having shapes other than square. For example, a non-square rectangle may be formed by four legs of equal length extending with the angles between the legs being, for example, 50, 130, 50, and 130 degrees apart (going clockwise or counter-clockwise around the hub unit). Or, non-rectangular shapes may be formed and marked, as will be understood by those familiar with geometry, for example, polygons (regular or irregular) with sides being equal in number to the legs extending out from the hub unit.

Figure 7:
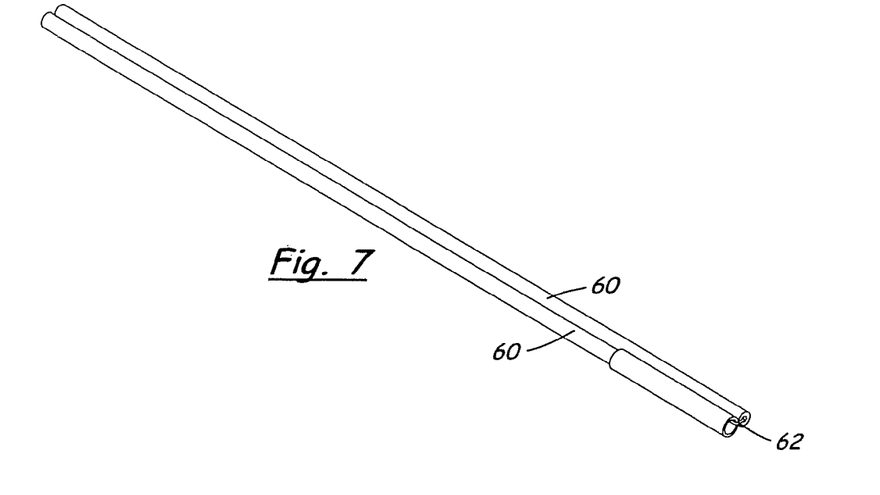
FIG. 7 is a perspective view of a portion of one of the preferred legs of the template device of FIGS. 1-6, wherein the leg portion comprises two rigid or substantially rigid segments that are separable from each other except that they connected by an elastic cord, wherein the elastic cord may bias the segments to slide one-into-the-other to form a single, elongated leg structure. The two segments may be two of several or many that are combined into a single, shock-corded leg that is used as one of the multiple legs installed in the hub unit.

The preferred central hub unit 14 is shown in the in-use position in FIG. 1A and is detailed in FIGS. 2-6. Central hub unit 14 serves primarily as the anchoring and centering mechanism for the collapsible legs 12 that are used to indicate the corners C of the square ring R. An example of one, but not the only, construction of legs 12 is illustrated in FIG. 7.

Figures 8, 9:
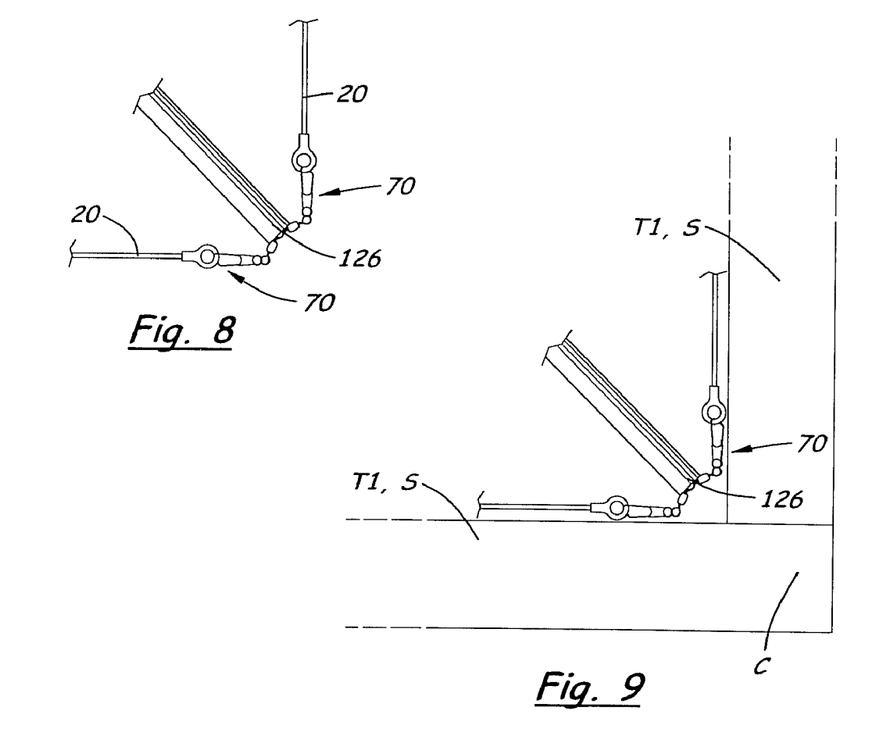
FIG. 8 is a partial view of the outer ends of two legs to which perimeter cables have been connected, thus, forming an outer perimeter corner of the preferred template device. While not shown in this Figure, it will be understood that the perimeter cables are attached to, and extend between, the leg that is shown and the two adjacent legs a distance from the pictured leg, for example, as is shown in FIG. 1.
FIG. 9 is a partial view of the template device corner of FIG. 8, after tape has been applied to the floor at the corner and along the lines indicated by the perimeter cables.
Figure 10:
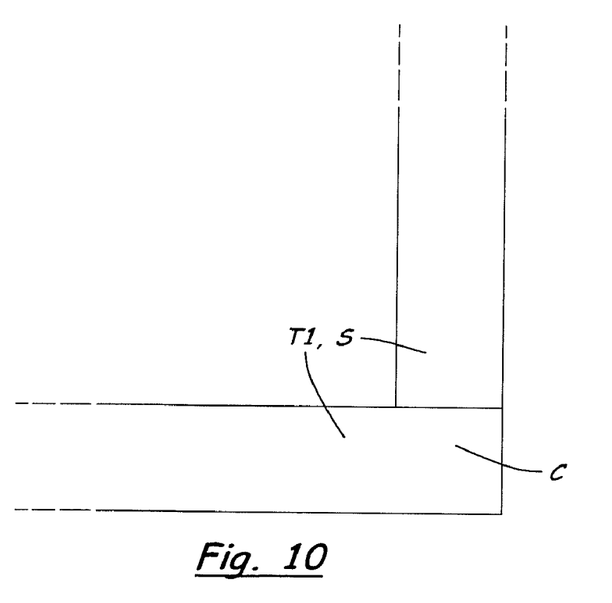
FIG. 10 is a partial view of the tape of FIG. 9, after removal of the template device, remaining in place on the floor for use as the perimeter of the Taekwondo ring.

A perimeter band, preferably comprising multiple cables 20, attaches to the end of each leg to indicate the sides S of the square. The cables 20 may comprise separate cables for each side of the square, and may be string, strip, woven or braided filaments, multiple- and/or single-filament, or other elongated material. The term "cable" in this Description and in the Claims is therefore a broad term including many elongated string, cord, wire, or strip material(s), including single filament, multi-filament, woven, twisted, and braided materials that are preferably flexible and may be coiled or bent for easy transport and storage. While string is included in the broad term "cable", it is preferred that any string included in the perimeter band of the template device is of material that is non-stretching. An Example of one, but not the only, construction of the cables 20 and their attachment to legs 12, is illustrated in FIGS. 8 and 9.

Indicia or "hash marks" may be provided on one or more of the cables 20, for example, ruler markings that indicate various distances from one end of a cable 20 to the other. Such indicia may be used for various purposes, including, but not limited to, methods of establishing a ring that is larger than the nominal size enabled by the particular template device. For example, in such methods, one may use a template device intended for establishing a 16 ft. ring to conveniently establish a 20 ft. ring without extending or otherwise modifying the legs. The user may set the template at the floor location corresponding to one desired corner of the 20 ft. ring. Then, the user may apply tape to the floor along two perpendicular 16 ft. cable-sides of the template device, and extend the tape out from the template device approximately an extra 4 feet by "eye-balling" the distance. After marking the tape at a location at the end of the cable (for example, with a pencil) to indicate the 16 ft. length of tape, the template device may be shifted by four feet to lie along the "extra" four feet of tape, by means of the user using the indicia on the cable to shift the device exactly four feet from the pencil-marked location. If said shifting of the template device indicates that the "extra" tape that was laid-down actually amounts to more than a four foot length (in other words, that the eye-balled extension of tape was not completely accurate), the user may trim or mark the tape so that total length of tape along that side is 20 feet (16 ft. plus the "extra" four ft.). Or, if said shifting of the template device indicates that the "extra" tape that laid-down actually amounts to less than a four foot length, then the user may apply a short "patch" of tape to bring the total tape length to 20 feet. Then, the user may continue to lay down tape on the other sides of the intended 20 ft. ring, providing an "eye-balled" extra 4 ft. length of tape on each side, and then checking the length and the squareness of the ring by shifting the 16 ft. template device on the floor.

Additionally or alternatively, one or more lengths of cable may be used inward relative to the outer ends of the legs, that is, nearer to the hub than the outer ends. Additionally or alternatively, indicia or "hash marks" may be provided on the legs at inward locations so that a user may mark smaller ring boundaries by "eyeballing" said boundaries in view of the indicia rather than using different legs or attaching interior cables/bands. Such techniques may allow, for example, ring boundaries less than the standard 16 ft ring for establishing smaller rings for younger competitors or for alternative sports and games, for example, for 4-7 year old competitors who would be overwhelmed by the sheer size of a larger ring. For example, hash marks or other indicia may denote ring boundaries at successive 1-foot intervals down to 10 feet (i.e. 15 feet, 14 feet, 13 feet, 12 feet, 11 feet and 10 feet).

Central hub unit 14, discussed in detail below, is one example of many possible hub structures that may be used to position and retain legs in their desired position extending out to the outer perimeter of the square. Preferably, the hub structure surrounds or otherwise retains each leg, preferably on multiple sides, so that the leg inner ends do not swing in any direction and do not slide inward or outward from the hub structure. Possible hub structures may include multiple-plate structures, single-plate structures, box-like or dome-like structures, or structures with other exterior and/or interior shapes. Possible hub structures may have interior spaces that receive and store telescoping legs, bores in an outer surface of the hub into which legs are slid and latched, and/or other leg-receiving apertures and/or other leg latching or locking means. Possible leg receiving and retaining systems, provided on the hub structure or the legs or both, may include friction/interference fits between the legs and the hub, latches and locks that engage the legs, or less preferably, integral construction, welding, adhesive, or other permanent means for retaining the legs in connection with the hub.

The preferred central hub unit 14 is a multiple-plate system into which legs 12 that are placed and retained in grooves between two separable plates. The legs 12 are preferably tightly received in the channels, especially when the upper plate 30 is tightened against the lower plate 32. Once the legs are installed and the plates tightened together, the inner ends of the legs 12 are trapped, or substantially trapped, between the plates. The leg inner ends are constrained from swinging-side-to-side, and constrained from movement inward toward, and outward from, the center of the hub unit. Thus, each leg inner end is prevented from leaving its respective desired leg line, prevented from moving inward (and, in effect, "shortening" in length) and prevented from moving outward (and, in effect, "lengthening" or even falling out of the hub unit). This way, force applied by cable(s) or by the user will not shorten or lengthen the legs. Also, this way, the user may lift and move the template device 10, as a single unit, to adjacent locations for marking of successive rings, without the leg length changing and without the legs falling away from the hub unit. During said lifting and moving, the legs 12 may flex slightly as discussed earlier in this Description (for example, into a slightly dome-shaped "network" structure with the hub unit at its apex), but, because the leg inner ends are trapped and constrained by the central hub unit 14 and the legs are semi-rigid and resilient, the device 10 substantially maintains its in-use shape and size, and is easily placed, and manually adjusted slightly if necessary, in a new location. See FIG. 13, for example.

The desired retention/constraint of the legs inner ends in the hub unit may comprise the channels having closed or blocked inner ends against which the leg inner ends abut. The closed or blocked inner end of each channel (provided, for example, by center post 50 in the preferred embodiment) is preferably the limit/stop that assures the user that each leg is fully inserted into the hub unit and will therefore extend the desired length out from the hub unit (and, hence, out from the center of the ring). Alternatively, a leg(s) may extend continuously through the hub unit so that it/they extend(s) out from the hub unit in opposite directions from the hub unit.

Referring specifically to FIGS. 2-6, upper plate 30 and lower plate 32 are held together by a fastener such as a bolt (34') and wing-nut (34") system 34. At least one, and preferably both, of the plates 30, 32 has/have channels 40, 42 that receive the inner ends 122 of the legs to an extent that the legs are retained and constrained, as discussed above. The preferred shape for the lower plate channels 42, is a V-shape, but alternative shapes may be used. The upper plate channels 40 may match the lower plate channels 42 in shape, or in shape and size, or may be differently-shaped and/or differently-sized as desired to effectively grip or otherwise retain and constrain the leg inner ends 122 in the hub unit 14.

The preferred upper plate 30 is portrayed as smaller that the lower plate 32, leaving a portion of the lower plate 32 uncovered, for viewing of a portion of the leg inner ends 122 and for providing space for attachment of handles 36 on an upper surface of the lower plate 32. Multiple plates of the hub, however, may be of the same size, or the upper plate may be larger than the lower plate. Handles may be affixed to the upper plate instead of the bottom plate.

To install the legs 12 into the hub unit 14, the upper plate 30 is loosened slightly, but preferably not removed from, the lower plate 32. With the upper plate channels 40 aligned with the lower plate channels 42, each leg is slid into its respective matching/mating set of chapels and is pushed-in to abut against the center post 50. The plates 30, 32 are tightened together, by use of the fastener system (such as bolt and wing-nut system 34), thus, retaining and trapping the legs inner ends 122.

Each leg is preferably fashioned from multiple shock-corded pole segments, such as tent poles made of fiberglass. The segments are preferably of 9.5 mm diameter fiberglass stock, but can be of practically any diameter. Alternatively or additionally, the legs could be made out other materials, for example, aluminum or steel or composite rod or tubing, fishing rod materials, telescoping fishing rod materials or other telescoping systems, and/or other materials. The legs or segments may be hollow tubular elements, solid cylinders, legs or segments of non-circular cross-section, and/or elements of other outer surface shapes.

Multiple pole segments 60 of this type may be aligned coaxially and the elastic cord 62 running through the hollow center of the segments will draw narrow ends to be received in larger ends of the adjacent segment, thus forming a long, rigid or substantially rigid leg. FIG. 7 illustrates two of such segments 60. Each leg may be made of several segments of a shock-corded pole, for example, with each segment being 2-3 feet long. One may see seven joints 64 between eight shock-corded pole segments 60 in each of the legs 12 of FIG. 1.

Preferably after the legs 12 are installed in the hub unit 14, cables 20 are attached to the leg outer ends 126. This may be done by various fasteners and means, but one preferred system is to provide fishing swivels fasteners 70, or other closable eyelets or hooks, at the outer ends 126, so that two cables may be attached to each leg outer end 126. See FIGS. 8 and 9, for example. Four equal-length cables 20 are provided, and the fishing swivel fasteners 70 are formed to all be the same length, so that connection of the four cables results in foul sides S of equal length.

Preferred hub structures are of sufficient weight, and/or comprise skid-resistant, non-marring and non-damaging feet or pads, so that they tend not to slide along the floor and do not damage the floor. This way, two people are not necessarily required to establish the rings, as any adjustments of the leg or cable locations performed by the primary user tend not to slide the hub structure. The preferred central hub unit 14 may be made of wood and provided with three feet 80 that ensure stable and skid-resistant contact with the floor. Alternative materials may be used, with thought given to the overall weight of the hub structure, or the addition of weights, to allow the hub unit to rest preferably without sliding or tipping, in the center of the ring, while the user adjusts the legs and cables if necessary and then marks the ring with tape or other marking material.

Figure 11:
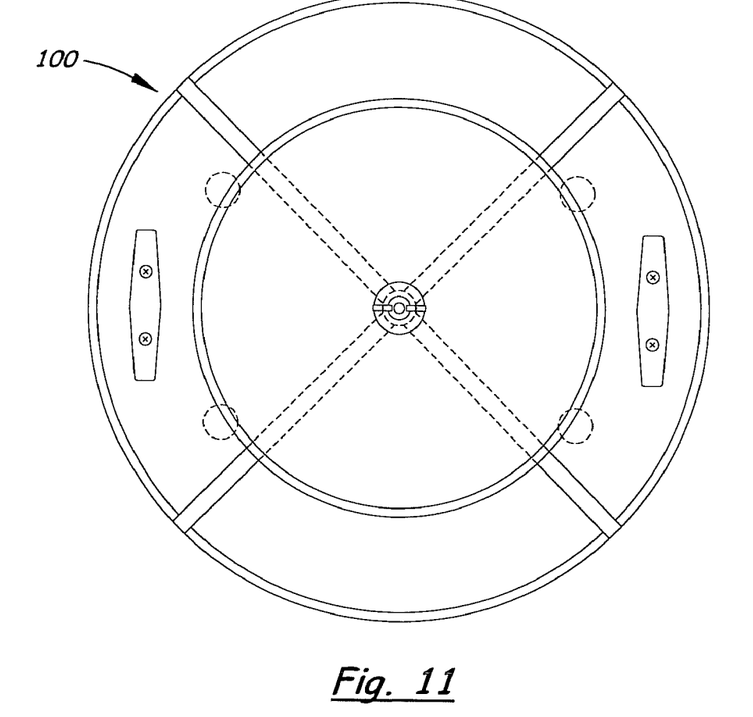
FIG. 11 is a top view of an alternative embodiment of a hub unit that may be used in a template device for establishing a four-cornered ring.
Figure 12:
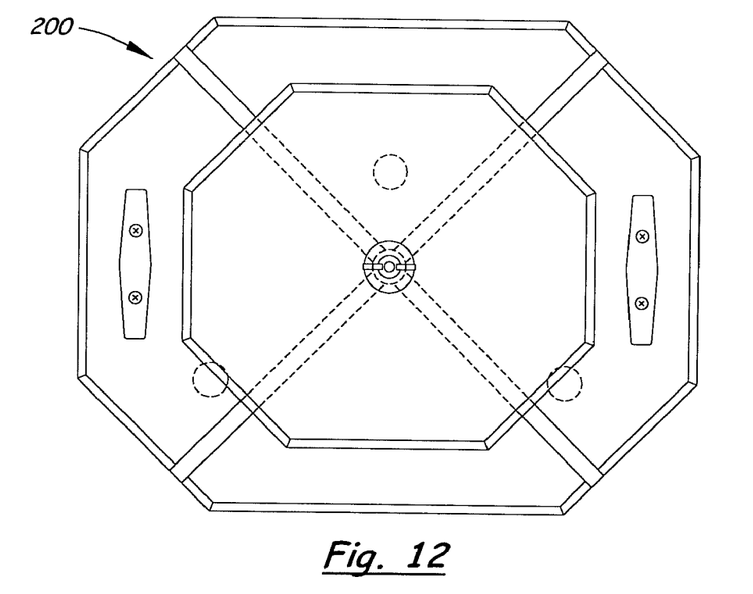
FIG. 12 is a top view of yet another alternative embodiment of a hub unit for use in a template device for establishing a four-cornered ring.

FIGS. 11 and 12 illustrates some of many alternative shapes for a multiple-plate hub structure, specifically, a circular hub unit 100 in FIG. 11 and an elongated octagon hub unit 200 in FIG. 12. Many other shapes and designs may be effective. For example, a single-plate unit could be designed to have leg-receiving bores extending into the perimeter edge of the plate, and to include latches for retaining legs in said bores, for example, pins, pegs, or set screw-type latches. Alternatively, a single-plate unit could be designed wherein substantially all of each leg would be visible when in use, and wherein straps, pins, pegs, cotter pins, hooks, or other latches might be used to connect the legs to, and constrain movement of the legs on a top surface of the hub structure. The multiple plate system of the preferred hub unit, however, is desirable because it is effective, aesthetically-pleasing, and also provides a fairly large top surface for a logo, team name(s), advertising, or other indicia that might be important to the user or to the sportsmen/women and/or competitors.

In some embodiments, the invented template device may be described as consisting of, or consisting essentially of, a central body with a rigid or substantially-rigid extension from the central body, and a flexible cable or other preferably-non-stretching, thin, flexible element that encircles the rigid extension. In other embodiments, the invented template device may be described as consisting of, or consisting essentially of, a central body and at least three rigid or substantially-rigid legs extending outward from the central body, and a flexible cable or other preferably-non-stretching, thin, flexible element that encircles the at least three legs. Preferably, the at least three legs and the flexible cable/element all lie entirely or substantially on a horizontal plane on a floor. Preferably, the extension, or the at least three legs, reach the outer perimeter of the desired geometric shape to the marked on the floor, but cover only a small fraction of the floor area inside said outer perimeter. For example, said small fraction may be preferably less than 10 percent or even less than 5 percent, so that the overall weight and volume of the template device is very small, and, hence, the template device is easy to carry, move, and break down into a small storage package. The preferred template device does not comprise fabric, cables, strings, or other flexible materials attached to or extending outward from the hub, except that cables or cords may be used in "shock-corded" legs, for example.

Although this invention has been described above and in the Figures with reference to particular means, materials and embodiments, it is to be understood that the invention is not limited to these disclosed particulars, but extends instead to all equivalents within the following claims.

The invention claimed is:

1. A template device for use in marking a polygon with corners and sides on a horizontal surface, the template device comprising:
a central body for lying on said horizontal surface;
a rigid or substantially rigid extension extending outward from the central body and having an outer perimeter reaching to locations corresponding to at least said corners of said geometric shape; and
wherein said template device comprises 90 percent or greater void space inside said outer perimeter so that said template covers less than 10 percent of the horizontal polygon area on the horizontal floor; and
wherein an inner portion of said extension is at least temporarily fixed to said central body so that said inner portion is immoveable relative to the central body, so that the extension does not slide outward from, and does not slide inward relative to, said central body during use.

2. A template device as in claim 1, further comprising a flexible perimeter band extending around the outer perimeter of said extension.

3. A template device as in claim 1, wherein said substantially rigid extension comprises three or more rigid or substantially-rigid legs radially extending out from the central body and having outer leg ends forming said outer perimeter.

4. A template device as in claim 1, wherein said substantially rigid extension consists only of three or more rigid or substantially-rigid legs radially extending out from the central body and having outer leg ends forming said outer perimeter.

5. A template device as in claim 3, wherein said legs comprises connected rigid pole segments.

6. A template device as in claim 5, wherein said legs comprise shock-corded pole segments.

7. A template device as in claim 4, wherein said legs comprises connected rigid pole segments.

8. A template device as in claim 7, wherein said legs comprise shock-corded pole segments.

9. A template device for use in marking a polygon with corners and sides on a horizontal surface, the template device comprising:
a central body for lying on said horizontal surface;
a rigid or substantially rigid extension extending outward from the central body and having an outer perimeter reaching to locations corresponding to at least said corners of said geometric shape; and
wherein said template device comprises 90 percent or greater void space inside said outer perimeter so that said template covers less than 10 percent of the horizontal polygon area on the horizontal floor;
wherein said substantially rigid extension comprises three or more rigid or substantially-rigid legs radially extending out from the central body and having outer leg ends forming said outer perimeter; and
wherein said central body comprises multiple plates tightened together and comprising a plurality of channels, said channels receiving said legs.

10. A template device for use in marking a polygonal shape on a floor, the device comprising:
a hub for being set upon a floor;
at least three legs extending generally horizontally out from the hub in different directions;
one or more cables connected to and extending between outer ends of said at least three legs to form a cable polygon with a desired polygonal shape, so that said cable polygon indicates where a polygonal shape perimeter is to be marked on the floor; and
wherein said at least three legs are rigid or substantially-rigid so that said cable polygon is retained by said rigid or substantially-rigid legs in said desired polygonal shape when the hub is lifted up off the floor for moving the template device to an adjacent area on the floor.

11. A template device as in claim 10, comprising four of said legs, and wherein said cable polygon is square.

12. A template device as in claim 10, wherein said hub comprises at least one non-skid lower surface for resting on the floor and wherein the hub is not adapted to be fixed to the floor.

13. A template device as in claim 10, wherein each of said at least three legs comprises multiple segments connected together during use in said template device and disconnectable from each other for storage.

14. A template device as in claim 10, wherein each of said at least three legs is a shock-corded pole having an elastic cord extending through multiple segments to bias the segments to connect into a single elongated leg.

15. A template device as in claim 10, wherein multiple of said at three legs comprise indicia between said hub and said cable for indicating where lines should be marked on the floor inside the interior of said cable polygon.

16. A template device as in claim 10, wherein said hub comprises two parallel plates with multiple channels in surfaces of said plates that receive inner ends of said at least three legs, and wherein said two parallel plates are tightened together to grip and lock the at least three legs in the hub.

17. A template device as in claim 10, comprising no stakes, no pins, and no fasteners for attaching said hub, said at least three legs, and said one or more cables to the floor.

18. A method of marking geometric shape on a floor, the method comprising:
providing a template device lying on but not fixed to the floor, the template device comprising:
a central body for placement on said floor;
a rigid or substantially rigid extension extending outward from the central body and having an outer perimeter reaching to locations at or near an outer extremity of said geometric shape; and
wherein said template device comprises 90 percent or greater void space inside said outer perimeter so that said template covers less than 10 percent of the horizontal polygon area on the floor; and
placing markings on the floor at or near said outer perimeter of said extension; and
moving said template device to an adjacent area of said floor by lifting the central body, whereby the extension retains its shape and moves with the central body.

19. A method as in claim 18, wherein the floor is marked with tape.

20. A method as in claim 18, wherein the markings form a martial arts ring.

21. A method as in claim 18, wherein said extension comprises at least three elongated, rigid or substantially-rigid legs.

22. A method as in claim 21, further comprising placing markings on the floor between indicia located on multiple legs of said at least three legs, wherein said indicia is between outer ends of said multiple legs and the central body.

23. A method as in claim 22, wherein the markings form a martial arts ring.

24. A method of marking geometric shape on a floor, the method comprising:
providing a template device lying on but not fixed to the floor, the template device comprising:
a hub set upon a floor;

at least three legs extending generally horizontally out from the hub in different directions and generally parallel to the floor, wherein the at least three legs are rigid or substantially-rigid;
one or more cables connected to and extending between portions of said at least three legs to form a desired geometric cable shape; and
wherein said at least three legs are rigid or substantially-rigid;
placing markings on the floor, along said one or more cables, that correspond to said geometric cable shape;
lifting the hub up off the floor and moving the template device to an adjacent area on the floor, whereby said rigid or substantially-rigid at least three legs substantially maintain said one or more cables in the desired geometric cable shape as the hub is lifted and moved.

* * * * *